(12) United States Patent
Chow et al.

(10) Patent No.: US 8,679,448 B2
(45) Date of Patent: Mar. 25, 2014

(54) CONFIGURATIONS AND METHODS OF TREATMENT OF SULFUR-CONTAINING VENT GASES

(71) Applicant: Fluor Technologies Corporation, Aliso Viejo, CA (US)

(72) Inventors: Thomas Chow, Irvine, CA (US); Theresa Flood, Mission Viejo, CA (US); Elmo Nasato, Oakville (CA); Uday Navin Parekh, Allentown, PA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 0 days.

(21) Appl. No.: 13/624,566

(22) Filed: Sep. 21, 2012

(65) Prior Publication Data

US 2013/0071315 A1    Mar. 21, 2013

Related U.S. Application Data

(60) Provisional application No. 61/537,446, filed on Sep. 21, 2011.

(51) Int. Cl.
  *B01D 19/00*    (2006.01)
  *B01J 10/00*    (2006.01)
  *C01B 17/027*   (2006.01)

(52) U.S. Cl.
  USPC ............. 423/576.2; 423/578.1; 422/168; 422/604

(58) Field of Classification Search
  USPC .............. 423/578.1, 576.2; 422/168, 604
  See application file for complete search history.

(56) References Cited

U.S. PATENT DOCUMENTS

| 4,198,386 | A * | 4/1980 | Laslo et al. ............ 423/574.1 |
| 4,478,811 | A | 10/1984 | Hass |
| 4,729,887 | A | 3/1988 | Pendergraft |
| 5,632,967 | A | 5/1997 | Nasato |
| 7,927,577 | B2 | 4/2011 | Rameshni et al. |
| 2005/0260121 | A1 | 11/2005 | Louie |
| 2010/0178236 | A1 | 7/2010 | Rameshni et al. |

FOREIGN PATENT DOCUMENTS

| WO | 95/06616 | 3/1995 |
| WO | 97/10174 | 3/1997 |
| WO | 02/088023 | 11/2002 |

OTHER PUBLICATIONS

Patent Cooperation Treaty, "Notification of Transmittal of the International Search Report and the Written Opinion of the International Searching Authority, or the Declaration", Nov. 30, 2012.

(Continued)

*Primary Examiner* — Timothy Vanoy
(74) *Attorney, Agent, or Firm* — Fish & Associates, PC

(57) ABSTRACT

Sulfur emissions from liquid sulfur are reduced, or even entirely avoided by degassing the liquid sulfur at pressure in an out-of-pit vessel and by sweeping the rundown pit (or vessel) with a sweep gas that is non-poisonous for a hydrogenation catalyst. Acid gases from degassing are fed at pressure to the Claus unit, while sweep gases are fed to the tail gas treatment unit to substantially recycle the acid gases to extinction. In preferred plants and methods, motive fluids and booster eductors or compressors are not needed, and incineration of the acid gases can be avoided.

20 Claims, 1 Drawing Sheet

(56) References Cited

OTHER PUBLICATIONS

Nasato, E. et al., "Sulfur Degasification—The D'GAAS(TM) Process", Goar, Allison & Associates, Inc., Presented at Sulfur Recovery Symposium Brimstone Engineering Services, Inc. and Brimstone Instrumentation Ltd., Sep. 23-26, 1997.

* cited by examiner

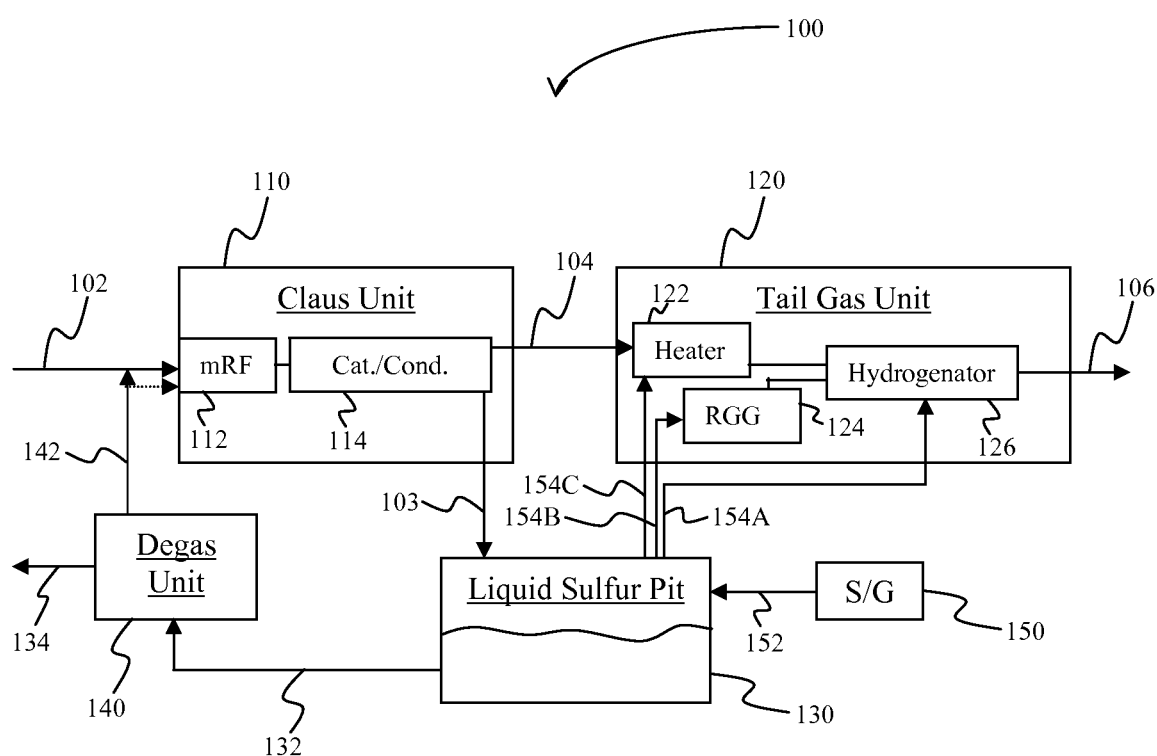

CONFIGURATIONS AND METHODS OF TREATMENT OF SULFUR-CONTAINING VENT GASES

This application claims priority to U.S. provisional application with the Ser. No. 61/537,446, which was filed Sep. 21, 2011.

FIELD OF THE INVENTION

The field of the invention is systems and methods of treatment of sulfur-containing vent gases, especially vent gases from liquid sulfur storage and handling.

BACKGROUND OF THE INVENTION

Numerous production plants, including various refineries, gas plants, upgrading plants, and gasification plants include sulfur recovery units (SRU) that produce liquid sulfur, which is typically in an un-degassed form and often contains 200 to 350 ppmw H2S. If the liquid sulfur is not degassed, H2S will be released during storage, handling, loading, and/or transport, which can create an explosive mixture of H2S in air. Moreover, H2S poses a toxicity hazard as well as a noxious odor problem when released from the un-degassed liquid or solid sulfur.

To manage the H2S release, various methods and systems are known in the art, including collection of the H2S via vents. However, such collection typically requires ejectors or blowers for routing the collected H2S to an appropriate location, which adds significant capital and/or operating expense. To avoid H2S release from vent gases, vents from un-degassed sulfur loading can be routed to an incinerator. Unfortunately, such routing increases the SO2 emissions to the atmosphere and is also less than desirable. Where larger volumes of degassing must be handled (e.g., in-pit degassing), vented streams have been routed to a sulfur recovery unit (SRU) main burner or reaction furnace chamber (mRF) via long runs of jacketed piping. A typical example for such configuration is shown in U.S. Pat. No. 4,478,811, and a somewhat similar system is shown in U.S. Pat. App. No. 2002/0159938. Unfortunately, such large vent volumes often cause problems with combustion air control in the SRU and insufficient furnace temperature, as well as corrosion and plugging of piping. These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

In still other known methods and systems, sulfur rundown pits (or vessels) are swept with air. While such sweep is conceptually simple, vent gases cannot be routed to the hydrogenation reactor (or associated heater/reducing gas generator (RGG)) as the oxygen in the vent gas tends to poison the hydrogenation catalyst. Additionally, it is difficult to collect vents from loading arms (e.g., truck, rail, or ship) as they are often not located nearby the SRU or any incinerator, or catalytic or thermal oxidizer. Similarly, storage tanks may also be remotely located and thus compound difficulties with routing sulfur-containing vent gases.

Further known methods of management of vent gases are described, for example, in WO 97/10174 where liquid sulfur is degassed in separate and serially arranged compartments. Here, a stream of finely divided oxygen-containing gas is combined under agitation with the liquid sulfur to reduce residual sulfide/polysulfide concentration. Unfortunately, while such methods is at least conceptually effective, significant material and complexity is required. Similar problems are encountered in WO 95/06616 where liquid sulfur is treated with stripping gas using a shroud and impeller. In further systems and methods, as for example, shown in U.S. Pat. No. 7,927,577, liquid jet pumps or eductors use a pumped liquid sulfur recycle stream as a motive fluid to boost sulfur rundown pressure and so provide entrainment and enough agitation in the liquid sulfur such that simultaneously degassing occurs within the sulfur collection piping and associated systems. However, such systems often add equipment costs and complexity.

In still further known systems, sulfur is degassed outside of a rundown pit using an oxidizing gas at elevated pressure as described in WO 02/088023. The so obtained waste gas is then used as a motive fluid in an eductor that carries sweep gas from the sulfur rundown pit. As used herein, the terms "rundown pit" and "vessel" when used in conjunction with collection of liquid sulfur are used interchangeably herein and refer to a containment that receives liquid sulfur from a sulfur producing process, most typically via a sulfur condenser. While such configurations and methods advantageously improve at least some of the operational parameters, several drawbacks nevertheless remain. Most significantly, where the waste gas and the sweep gas are fed to the SRU, operation of the SRU is often adversely affected. To avoid such drawbacks, the waste gas and sweep gas can be fed to an oxidizer. However, such treatment leads to the production of sulfur oxides, which have to be appropriately dealt with.

Thus, even though there are various systems and methods for sulfur-containing vent gas treatment known in the art, all or almost all of them suffer from one or more disadvantages. Therefore, there is still a need for improved configurations and methods of treatment of sulfur-containing vent gases.

SUMMARY OF THE INVENTION

The inventive subject matter provides plants, devices, and methods of handling various acid gas-containing streams originating from liquid sulfur. In especially preferred aspects of the inventive subject matter, all acid gas-containing streams are recycled to the sulfur recovery unit and tail gas treating unit such that no sulfur emissions are produced from the acid gas-containing streams. Viewed from another perspective, contemplated configurations and methods allow operation without routing the acid gas-containing streams to a combustor that would produce sulfur oxide emissions. Still further, it is noted that by virtue of degassing the liquid sulfur product to very low levels of H2S, no significant release of H2S is encountered during storage or handling. Most preferably, acid gas-containing streams from out-of-pit degassing are fed to the main reaction furnace of the SRU under pressure, while acid gas-containing sweep streams from the rundown pit are fed to the tail gas unit (e.g., reducing gas generator, heater, and/or hydrogenator).

In one preferred aspect of the inventive subject matter, a method of handling vent gases from liquid sulfur includes a step of receiving in a rundown pit liquid sulfur from a Claus unit, and another step of providing a sweep gas at a first pressure to a head space in the rundown pit (or vessel), thereby forming an acid gas-containing sweep gas. In yet another step, a portion of the liquid sulfur is conveyed from the rundown pit to a degassing unit, and a purge gas is used at a second pressure in the degassing unit to degas the liquid sulfur, thereby forming a degassed liquid sulfur product and an acid gas-containing purge gas. Contemplated methods further include a step of feeding the acid gas-containing sweep gas to a component of a tail gas unit (e.g., reducing gas generator, heater, and/or hydrogenator), and another step of feeding the acid gas-containing purge gas to the main reactor furnace of the Claus unit.

It is especially preferred that feeding the acid gas-containing sweep gas to the component of the tail gas unit is performed at the first pressure, and/or that feeding the acid gas-containing purge gas to the main reactor furnace of the Claus unit is performed at the second pressure. It is still further preferred that the acid gas-containing sweep gas is suitable for use in the tail gas unit. Thus, the acid gas-containing sweep gas will have a composition that is non-poisonous to a hydrogenation catalyst of the hydrogenator in the tail gas unit. For example, a particularly preferred sweep gas will have an oxygen content of less than 5 mol %, and/or comprise at least 90 mol % nitrogen. It is also preferred that the first pressure is between 1 and 5 psig, while the second pressure is between 10 and 200 psig. Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

While not limiting to the inventive subject matter, it is generally contemplated that the Claus unit receives an acid gas from a hydrocarbon refinery, a gas processing plant, an upgrading plant, and/or a gasification plant. Likewise, it is contemplated that the degassed liquid sulfur product is transported to a storage container, a forming unit, and/or a loading unit.

Therefore, and viewed from a different perspective, the inventors also contemplate a method of treating acid gas-containing gas streams originating from liquid sulfur in which an acid gas-containing sweep gas is produced in a rundown pit from the liquid sulfur. In such methods, an acid gas-containing purge gas is produced in a degassing unit at a pressure that is at least an operating pressure of a main reactor furnace of the Claus unit. Consequently, it is also contemplated that in such methods the acid gas-containing sweep gas can be fed to a tail gas unit that is fluidly coupled to the Claus unit, and that the pressure of the degassing acid gas-containing purge gas can be used to move the sweep acid gas-containing purge gas to the main reactor furnace of the Claus unit.

Most typically, the pressure of the degassing acid gas-containing purge gas will be between 10 and 200 psig, and the acid gas-containing sweep gas has a composition that is non-poisonous to a hydrogenation catalyst of a hydrogenator in the tail gas unit. While not limiting to the inventive subject matter, it is also preferred that the rundown pit has a volume that is equal or less than a 24 hour, more typically equal or less than a 12 hour, even more typically equal or less than a six hour, and most typically equal or less than a four hour working volume.

Consequently, the inventors also contemplate a sulfur production and processing plant that includes a Claus unit that receives an acid gas from an acid gas source and that produces a tail gas, wherein a tail gas unit is fluidly coupled to the Claus unit to receive the tail gas and to produce a stack gas. In contemplated plant, a rundown pit is fluidly coupled to the Claus unit and receives liquid sulfur from the Claus unit. A sweep gas source is coupled to the rundown pit and provides a sweep gas at a first pressure to the head space in the rundown pit to thereby form an acid gas-containing sweep gas, and a degassing unit is coupled to the rundown pit and receives a portion of the liquid sulfur from the rundown pit. In contemplated plants, the degassing unit uses a purge gas at a second pressure to degas the liquid sulfur, thereby forming a degassed liquid sulfur product and an acid gas-containing purge gas, wherein a first conduit feeds the acid gas-containing sweep gas from the rundown pit to the reducing gas generator, heater, and/or hydrogenator of a tail gas unit, and wherein a second conduit feeds the acid gas-containing purge gas from the degassing unit to the main reactor furnace of the Claus unit.

In such plants it is generally preferred that the rundown pit has a volume that is equal or less than a six hour working volume, and that the sweep gas has a composition that is non-poisonous to a hydrogenation catalyst of the hydrogenator in the tail gas unit. Most typically, the acid gas-containing sweep gas has a pressure of between 1 and 5 psig, and the acid gas-containing purge gas has a pressure of between 10 and 200 psig. Moreover, it is generally preferred that the acid gas-containing purge gas from the degassing unit is fed to the main reactor furnace of the Claus unit without use of a motive gas or booster.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 1 is a schematic of an exemplary plant according to the inventive subject matter.

DETAILED DESCRIPTION

The inventors have discovered that liquid sulfur produced by a sulfur recovery unit can be processed such that the liquid sulfur will have a zero net contribution to sulfur emission from the plant. In especially preferred aspects of the inventive subject matter, plant configurations, devices, and methods are contemplated for collection of various acid gas-containing gas streams originating from liquid sulfur (e.g., from degassing operation, sweeping, etc.) to so decrease emissions of H2S and SO2 vapors otherwise emitted from pumping, handling, and/or loading of un-degassed liquid sulfur, and to so increase safety wherever sulfur is being recovered. Thus, in the configurations and methods presented herein, the risk of explosion, personnel exposure, and odor nuisance are dramatically reduced, while at the same time acid gas-containing gas streams (containing H2S and/or SO2) can be readily collected and processed with near-zero emissions.

The following discussion provides various example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed. As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

For example, as schematically illustrated in FIG. 1, a sulfur production and processing plant includes three integrated processes, (a) degassing of the liquid sulfur prior to storage and/or loading, (b) degassing the liquid sulfur out-of-pit (i.e., outside the rundown pit or vessel) at pressure and routing the acid gas-containing purge gas back to the SRU/mRF, and (3) use of nitrogen or other substantially oxygen-free gas for sweeping the rundown pit (or other vessel), and routing of the so produced acid gas-containing sweep gas back to the tail gas treatment unit. Consequently it should be appreciated that contemplated configurations and methods help avoid routing any vents to the incinerator and thereby essentially completely avoid SO2 emissions to the atmosphere.

Here, sulfur production and processing plant 100 has a Claus unit 110 and a tail gas unit 120. Sulfur produced in the Claus unit is routed to a liquid sulfur pit (or vessel) 130, and at least a portion of the liquid sulfur is fed to the degassing unit 140. The sulfur pit is swept with sweeping gas from sweep gas unit 150. In most instances, acid gas 102 is provided to the Claus unit from a hydrocarbon refinery, a gas processing plant, an upgrading plant, or a gasification plant (not shown). Claus unit 110 is typically a conventional Claus unit with one or more main burner-reaction furnaces 112 and a series of Claus catalytic reactors and condensers 114 that produce a liquid sulfur stream 103 and tail gas 104.

Tail gas 104 is fed in conventional manner to the tail gas unit 120 and is typically introduced into a heater 122 prior to hydrogenation in hydrogenation reactor 126. Alternately, reducing gas for the reduction may be provided by reducing gas generator 124 which would heat the tail gas 104 prior to hydrogenation. Effluent gas 106 may be further treated by various tail gas treating methods and is then routed to the atmosphere as stack gas or otherwise disposed/routed to final destination.

Liquid sulfur pit 130 is configured to receive sulfur from the condensers of Claus unit 110, and further configured to have a headspace above the liquid sulfur. A sweep gas unit 150 provides nitrogen stream 152 to the headspace as sweeping gas, preferably at a low pressure of between 1-5 psig. The so formed acid gas-containing sweep gas is then removed from the headspace (preferably using pressure from the sweep gas unit) to the heater 122, reducing gas generator 124, and/or hydrogenator 126 via conduits 154C, 154B, and 154A, respectively. In still further preferred aspects of the inventive subject matter, the liquid sulfur is fed from the liquid sulfur pit 130 as stream 132 to the degassing unit 140. Most preferably, the degassing unit 140 operates at elevated pressure using air or other oxygen-containing gas to produce a degassed liquid sulfur product 134 that is routed as appropriate for storage, transport, forming, or other handling, while the acid gas-containing purge gas 142 is routed back to the SRU/mRF.

It should be particularly noted that in most preferred aspects the pressure of the acid gas-containing purge gas 142 is sufficient to avoid the need for a booster or ejector, which advantageously and significantly reduces the volume of the acid gas-containing purge gas and thus allows simplified operation of the SRU/mRF. Moreover, as degassing is performed out-of-pit, the pit volume can be substantially reduced, which in turn allows for a reduction in acid gas-containing sweep gas, thus allowing feeding of the acid gas-containing purge gas directly to the tail gas unit (provided a non-poisonous sweep gas is employed). Consequently, it should be appreciated that all sulfur-containing gases from the liquid sulfur are recycled back to the Claus unit and tail gas unit, thereby allowing for a net zero sulfur emission from the liquid sulfur while producing a liquid sulfur product with residual sulfide/polysulfide content of equal or less than 10 ppmw, and more typically equal or less than 5 ppmw.

With respect to the sweep gas it is generally preferred that the sweep gas is nitrogen gas, which can be readily supplied from storage, an air separation unit, or other available nitrogen source. The sweep nitrogen supply may or may not be heated. However, it should be noted that various alternative sweep gases may also be used, especially those that do not include oxygen in an amount that would otherwise poison a hydrogenation catalyst. For example, alternative sweep gases include argon, neon, or other inert gases in relatively pure form (e.g., >95 mol %), but also mixtures of various inert gases. Moreover, it is also contemplated that the sweep gas may also be a portion of the heater and/or reducing gas generator effluent (which will typically be at least partially cooled) and/or a portion of the hydrogenation reactor effluent.

In further especially preferred aspects of the inventive subject matter, the sweep gas will be provided to the rundown pit at pressure so to eliminate need for any mechanical device in sweeping the rundown pit and moving the acid gas-containing sweep gas to the tail gas unit. For example, where the sweep gas is provided from an air separation unit or compressed storage, the sweep gas pressure will preferably be in the range of 1-25 psig, more typically 1-10 psig, and most preferably in the range of 1-5 psig. Thus, and viewed from a different perspective, it is preferred that the sweep gas is provided at a pressure that is suitable to convey the acid gas-containing sweep gas to the tail gas unit at the operating pressure of the component (e.g., operating pressure of the reducing gas generator, the heater, or the hydrogenator). As the size of the rundown pit (vessel) is significantly reduced as compared to other heretofore known plants and methods, it is expected that the volume ratio of acid gas-containing sweep gas to tail gas from the Claus unit will be between 1:10 and 1:50, more typically between 1:20 and 1:100, and most typically between 1:50 and 1:250 (and even higher).

With respect to the out-of-pit degassing it is contemplated that all known out-of-pit degassing processes are deemed suitable for use herein. However, it is particularly preferred that the out-of-pit degassing is performed at elevated pressure to so increase efficiency and with that substantially reduce contact time and vessel volume. Additionally, degassing processes without use of catalyst are especially preferred. For example, a particularly preferred degassing process is Goar Allison Associates' D'GAASS™ process (sulfide removal via counter-current contact with air in pressurized vertical vessel). Consequently, especially preferred purge gases include air and oxygen-containing gases. With respect to suitable pressures for the acid gas-containing purge gas produced by the degassing, it is generally contemplated that the pressure will depend on the particular technology employed and may vary. However, particularly preferred pressures will be this that are suitable for direct injection of the acid gas-containing purge gas into the Claus unit, and especially in the mRF of the Claus unit. In such case, it should be particularly appreciated that no motive fluid (and with the increased volume) is required, leading to significantly reduced, if not eliminated interference with the operation of the Claus unit. More specifically, diluent and cooling impact of the acid gas-containing purge gas is no longer a critical factor. Thus, suitable pressures of the acid gas-containing purge gas will be between 10 and 200 psig, and more typically between 5 and 100 psig. Consequently, it should be noted that the acid gas-containing purge gas can be moved to the Claus unit without the need for an eductor, compressor, and/or other booster.

It should also be noted that the out-of-pit degassing process at pressure minimizes the required rundown pit vessel volume, which in turn minimizes the sweep gas volume (and with that adverse effects on the tail gas unit). For example, suitable rundown volumes will be a volume that is equal or less than a twenty-four hours, and more typically a four hour working volume. It should be noted that where nitrogen (or other inert gas) blanketing of the pit, vessel, or tank vapor space is used in lieu of an air sweep, pyrite formed on the steel components could rapidly ignite in the event of a sudden gush of air inadvertently entering the pit, vessel, or tank for any reason. Therefore, additional safety measures are also contemplated that reduce or even eliminate ignition of pyrite upon inadvertent exposure to oxygen.

Where desirable or otherwise needed, the rundown pit (vessel) may include an ejector (or blower or other mechanical device) to direct the nitrogen sweep vent to the hydrogenation reactor or other component of the tail gas unit. However, it should be appreciated that the rate of the motive fluid is greatly reduced, due to the much lower destination pressure (typically 3 psig or lower at the hydrogenation bed, as compared to the typical 10-12 psig at the mRF). Depending on the operating conditions, it may be possible to maintain a slight pressure (e.g., between 1-7 psig) on the sulfur rundown collection vessel and thus route the nitrogen sweep vent to the hydrogenation section without a mechanical driving force. This is expected to be suitable for many Claus unit locations. Because the sulfur is degassed prior to storage and loading, the need for vapor recovery systems from remote un-degassed storage tanks, loading arm areas, and/or sulfur forming facilities is eliminated. Thus, the difficulty inherent to routing sulfur-laden gases from these remote areas is avoided. With further respect to ducting, piping, and associated equipment, it should be noted that all such known elements are deemed suitable for use herein.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of handling vent gases from liquid sulfur, comprising:
   receiving in a rundown pit liquid sulfur from a Claus unit while separately feeding a tail gas from the Claus unit to a tail gas unit, and providing a nitrogen stream or inert sweep gas from a sweep gas unit at a first pressure to a head space in the rundown pit, thereby forming an acid gas containing sweep gas;
   conveying a portion of the liquid sulfur from the rundown pit to a degassing unit, and using a purge gas at a second pressure in the degassing unit to degas the liquid sulfur, thereby forming a degassed liquid sulfur product and an acid gas containing purge gas;
   feeding the acid gas-containing sweep gas to at least one component of the tail gas unit that is fluidly coupled to the Claus unit, wherein the component is selected from the group consisting of a reducing gas generator, a heater, and a hydrogenator; and
   feeding the acid gas-containing purge gas to the main bunter or reactor furnace of the Claus unit.

2. The method of claim 1 wherein the step of feeding the acid gas-containing sweep gas to the at least one component of the tail gas unit is performed at the first pressure.

3. The method of claim 1 wherein the step of feeding the acid gas-containing purge gas to the main reactor furnace of the Claus unit is performed at the second pressure.

4. The method of claim 1 wherein the sweep gas has a composition that is non-poisonous to a hydrogenation catalyst of the hydrogenator in the tail gas unit.

5. The method of claim 1 wherein the sweep gas has an oxygen content of less than 5 mol %.

6. The method of claim 1 wherein the sweep gas comprises at least 90 mol % nitrogen.

7. The method of claim 1 wherein the first pressure is between 1 and 5 psig.

8. The method of claim 1 wherein the second pressure is between 10 and 200 psig.

9. The method of claim 1 further comprising a step of providing an acid gas to the Claus unit from a hydrocarbon refinery, a gas processing plant, an upgrading plant, or a gasification plant.

10. The method of claim 1 further comprising a step of conveying the degassed liquid sulfur product from the degassing unit to a storage container, a forming unit, or a loading unit.

11. A method of treating acid gas-containing gas streams originating from liquid sulfur, comprising:
    producing in a rundown pit an acid gas-containing sweep gas from the liquid sulfur and nitrogen or an inert sweep gas from a sweep gas unit, and producing in a degassing unit an acid gas-containing purge gas at a pressure that is at least an operating pressure of a main burner or reactor furnace of the Claus unit;
    feeding the acid gas-containing sweep gas to a tail gas unit that is fluidly coupled to the Claus unit, wherein the Claus unit separately provides a tail as to the tail gas unit;
    using the pressure of the acid gas-containing purge gas to thereby move the acid gas-containing purge gas to the main burner or reactor furnace of the Claus unit.

12. The method of claim 11 wherein the pressure is between 10 and 200 psig.

13. The method of claim 11 wherein the acid gas-containing sweep gas has a composition that is non-poisonous to a hydrogenation catalyst of a hydrogenator in the tail gas unit.

14. The method of claim 11 wherein the rundown pit has a volume that is equal or less than a twenty-four hour working volume.

15. A sulfur production and processing plant, comprising:
    a Claus unit configured to receive an acid gas from an acid gas source and to produce a tail gas, and a tail gas unit that is fluidly coupled to the Claus unit and configured to receive the tail gas from the Claus unit and to produce a stack gas;
    a rundown pit fluidly coupled to the Claus unit and configured to receive liquid sulfur from the Claus unit while the Claus unit provides the tail gas to the tail gas unit;
    a sweep gas source fluidly coupled to the rundown pit and configured to provide nitrogen or an inert sweep gas at a first pressure to a head space in the rundown pit to thereby form an acid gas-containing sweep gas;
    a degassing unit fluidly coupled to the rundown pit and configured to receive a portion of the liquid sulfur from the rundown pit, and further configured to use a purge gas at a second pressure to degas the liquid sulfur, thereby forming a degassed liquid sulfur product and an acid gas-containing purge gas;

a first conduit fluidly coupled to the rundown pit and at least one component of the tail gas unit to allow feeding the acid gas-containing sweep gas from the rundown pit to the at least one component, wherein the component is selected from the group consisting of a reducing gas generator, a heater, and a hydrogenator; and a second conduit fluidly coupled to degassing unit and a main reactor furnace of the Claus unit to allow feeding the acid gas-containing purge gas from the degassing unit to the main reactor furnace of the Claus unit.

16. The plant of claim 15 wherein the rundown pit has a volume that is equal or less than a six hour working volume.

17. The plant of claim 15 wherein the sweep gas has a composition that is non-poisonous to a hydrogenation catalyst of the hydrogenator in the tad gas unit.

18. The plant of claim 15 wherein the acid gas-containing sweep gas has a pressure of between 1 and 5 psig.

19. The plant of claim 15 wherein the acid gas-containing purge gas has a pressure of between 10 and 200 psig.

20. The plant of claim 15 wherein the second conduit is configured such that the acid gas-containing purge gas from the degassing unit is fed to the main burner/reactor furnace of the Claus unit without use of a motive gas or booster.

* * * * *